Patented July 18, 1939

2,166,324

UNITED STATES PATENT OFFICE 2,166,324

RUBBER COMPOSITION AND PROCESS

Willis E. Reichard, Elyria, and Robert R. Olin, Akron, Ohio

No Drawing. Application July 10, 1937, Serial No. 153,060

8 Claims. (Cl. 106—23)

The present invention relates to improvements in rubber composition and process and relates more particularly to the manufacture of caoutchouc compositions, which involve more particularly an improved composition of matter forming an article of commerce involving a mixture of vulcanized caoutchouc or rubber material with an unvulcanized gum of the type represented by the product of certain tropical trees, commonly called balata, and an improved golf ball comprising an outer cover having as its chief constituent the said composition of matter; both rubber and balata materials are originally secured in the form of a milky latex from tropical plants producing them and may be subsequently susceptible of being dried to form gummy substances and by subsequent treatment are susceptible of being vulcanized to change physical properties of the materials. Although rubber is commonly exported from the point of origin to the United States of America and elsewhere, in the form of the original latex, balata is very seldom so exported except in the form of a crude gum.

It has previously been proposed to provide outer covers for golf balls having refined balata as its principal constituent and in at least one case, as disclosed in United States Letters Patent No. 1,405,845 to Harry A. Hoffman, dated February 7, 1922, it is proposed to provide such a cover comprising these materials in the preferred relative proportions of 90% balata and 10% rubber, both of said materials being in the solid vulcanized state; golf ball covers which have been previously used employing either vulcanized or substantially unvulcanized balata without the addition of vulcanized rubber thereto, have been commonly used but upon commonly occurring improper striking by the head of a golf club when the balls are in play, the covers which, although including a small amount of rubber material in combination with a major constituent of vulcanized balata are still somewhat susceptible to the objection of cutting. Moreover, in the latter case, the commercial production and application of the covers and the painting hereof is only achieved at an undesirable high cost.

We have discovered that by the mixture of a previously vulcanized rubber latex with unvulcanized balata, the rubber latex being previously and separately prepared in any suitable manner, but preferably as set forth in United States Letters Patent No. 1,443,149 to Philip Schidrowitz, dated January 23, 1923, and preferably also involving the improved method as set forth in United States Letters Patent No. 1,939,635 to Harry B. Townsend, dated December 12, 1933, that a highly improved cover stock for golf ball covers may be evolved having superior properties of toughness to avoid cutting of the ball when improperly struck by golf clubs in play and without any appreciable loss in efficiency or desirable properties involved in the play of the ball, such as distance, "click" and putting effects.

At the same time, we find that our use of a previously vulcanized rubber latex material in the finished composition comprising balata material in suitable proportions effects a very considerable economy in the manufacture of golf ball covers, since scraps of the material left over during the process may readily be re-used with new material without appreciable change in the resultant properties of the resultant cover stock or loss in efficiency of the completed covered golf ball.

In the production of the cover material as a composition of matter, we have evolved an improved process whereby the manufacture of this composition of matter can be more efficiently accomplished both as to superiority of resultant product and manufacturing operations.

Our invention, therefore, has as an object the production of an improved composition of matter which has a particular application as cover material for golf balls, although not limited thereto.

Another object of our invention is to provide a composition of matter which when utilized in a composition for golf ball covers results in the covers being less readily cut in play with no appreciable loss in the other desirable qualities of a golf ball cover as compared to the prior balata covers.

Another object of our invention is to provide an improved composition of material comprising a substantially homogeneous mixture of vulcanized rubber and unvulcanized balata in varying proportions for different uses.

Another object of our invention is to provide an improved golf ball cover.

Another object of our invention is to provide an improved golf ball of superior playing qualities having a cover which is not unduly susceptible to cutting blows.

Another object of our invention is to provide an improved golf ball cover which may be readily painted without requiring unduly expensive special treatment preliminary thereto.

Another object of our invention is to provide for economical manufacture of superior cover stock for golf balls and the like.

Another object of our invention is to provide an improved cover for golf balls comprising unvulcanized balata and having superior heat resisting qualities as compared to prior balata covers.

Another object of our invention is to provide for an improved process for manufacturing the improved composition of material as set forth above.

Other objects of our invention and the invention itself will become more apparent by reference to the following specification which sets forth my invention in its different aspects as we preferably embody said invention.

Workers in the rubber art and in the art of manufacturing golf balls recognize the essential differences in properties and necessary differences in working the material, called balata, which may be secured as a milky juice from tropical plants indigenous to Brazil, and which is commonly dried for export into the form of a balata gum, and other kindred products such as caoutchouc or rubber which is secured in the form of latex as a milky or colored juice from several different plants of tropical South America, Asia, and Africa, and which when vulcanized is used for many purposes.

It is found also that balata gum can also be vulcanized and as an instance thereof reference is hereby made to the above mentioned patent to Hoffman, which discloses a golf ball covered with material comprising as ingredients, vulcanized rubber and vulcanized balata.

We believe, however, that it has never heretofore been recognized that a composition of material comprising chiefly unvulcanized balata and vulcanized rubber, as herein set forth, suitable for use for golf ball covers, could be commercially produced, and which in any event would have the highly advantageous properties secured in the cover material of our invention, and at the same time resulting in economies of manufacture effected by use of this material.

Although we have chosen to describe our improved composition as utilized in the manufacture of golf balls, it is understood that due to the toughness and wearing qualities thereof it is equally applicable to many other uses.

In general, our improved composition is characterized by providing as its principal constituent, unvulcanized balata like material and previously vulcanized rubber preferably supplied to the balata-like material in the form of a vulcanized rubber latex preferably prepared according to the Schidrowitz and Townsend patented processes previously referred to, both materials being substantially uncoagulated when mixed together.

Various means well known in the art may be employed in preparing the unvulcanized balata solution, one such method being hereinafter described. The balata gum as received is in relatively large units which are chopped into comparatively fine pieces. The chopped pieces of balata are then forced through rolls which crack and masticate the balata and squeeze considerable water therefrom, the balata being delivered from the rolls in crushed, shredded form and then dried.

The balata gum is then washed in gasoline to substantially remove the impurities including resins which are dissolved by the gasoline. The purified and de-resinated balata gum is then dried in any suitable manner. The refined balata is then placed in a tank containing benzol or like solvent, and preferably agitated, the balata being dissolved in the benzol, to form with it a thick syrupy fluid, other impurities still remaining therein being further removed by sedimentation. The purified solution is then drawn off at a point above the sediment line.

The refined balata and benzol solution as above prepared is then thoroughly mixed with the previously vulcanized uncoagulated aqueous dispersion of rubber latex previously mentioned, the said vulcanized rubber aqueous dispersion and unvulcanized balata solution being very violently whipped or otherwise agitated to provide an emulsion of the aqueous dispersion and the benzol solution, the emulsifying operation being carried at least far enough to effect a reasonably stable emulsion.

Although we contemplate that the mixed balata and vulcanized latex liquid will be used in a generally continuous process, as hereinafter described, the mixture may be stored in drums for a considerable period without impairment of the efficiency thereof in forming the after-described composition.

The benzol and de-resinated balata solution is mixed, as hereinafter described, with the vulcanized latex in any suitable proportions, although we contemplate that other materials, such as glue, may be added to the compositions; the glue if used preferably is added to the vulcanized latex prior to admixture with the balata-benzol solution. The emulsion is then coagulated in any suitable way, such as by supplying it to a liquid bath of alcohol, acetone, or the like, the coagulated being precipitated as a substantially homogeneous mass, of the desired composition of matter.

After coagulating the material as previously described, this composition of matter may be further processed on a conventional two-roll rubber mixing mill or in an internal rubber mixer of the Banbury type and other conventional rubber compounding materials may be added in the usual manner excepting any vulcanizing materials which are not contemplated but rather avoided to prevent vulcanization of the balata portions of the composition. Among such compounding materials are coloration pigments such as zinc oxide, titanium dioxide, or the like, which are commonly employed to give the resultant product the proper color.

The further processing of the material to render it suitable for golf ball covers is like that previously employed in the art involving a thoroughly masticating rubber mill operation, a drying operation to evaporate the moisture therefrom, a rolling operation to shape the materials so that discs may be easily provided therefrom, then the subsequent forming of discs of the proper size and thickness from the composition material and preferably at the same time or subsequently into the form of substantially hemi-spherical cups, which in turn are placed over the golf ball's core in opposite cooperative center enclosing relation, and then under the influence of great pressure and heat the hemi-spherical halves are melted and pressed together to form a spherical enclosure for the golf ball with the proper surface markings, which is determined by the inner surface forms of the press dies.

The overflow of cover stock at the juncture of the cover halves is trimmed from the balls and incidentally this extra material which in prior vulcanized constructions is ordinarily wasted, can be added to the masticating rolls with new composition material and without appreciably adversely affecting the properties of the resultant covers. This re-use of the by-product portions of the material is susceptible of accomplishment because the balata material is not substantially vulcanized at any stage in the process.

The above description relates to a typical embodiment of our invention involving a particular routine employed for the manufacture of complete golf balls having covers embodying the improved composition material of our invention. We are aware, however, that the cover material may be employed to cover golf balls in other ways than as described, but within the scope of our invention.

The process we describe, however, we consider to be highly advantageous and more effective and economical.

While we have above described our invention used for the purpose of providing improved golf balls comprising covers which include as a principal constituent our improved composition of material as evolved by the described improved process, we are aware that numerous other uses may be made of the improved composition of material, as above set forth. We find that for golf ball covers a highly desirable cover can be evolved wherein the relative proportions of unvulcanized balata and vulcanized rubber are as 55 is to 45 and within a range varying from 25% balata to 65% balata. For other purposes than golf balls, the best proportions might be considerably different and in a different range of relative proportions. We therefore claim our invention more broadly than any particular proportion for general uses.

Although in the specification and the subjoined claims, we have referred to rubber, balata and latex, it will be understood that we contemplate that these terms shall be construed in the broadest sense to include the equivalent materials which are either natural or synthetic products and independently of their origin; and where such terms are employed in the claims as a matter of convenience, they are to be construed in the light hereof.

Having thus described our invention as we prefer to practice it, we claim:

1. The process of providing an improved composition of material consisting in separately preparing an aqueous dispersion of uncoagulated vulcanized rubber latex and mixing it with unvulcanized balata solution to form a substantially homogeneous mixture in the absence of sufficient balata vulcanizing materials to promote vulcanization of the balata.

2. The improved process of preparing an improved composition of matter consisting in separately preparing an aqueous dispersion of vulcanized rubber latex, and a substantially non-aqueous solution of substantially de-resinated unvulcanized balata or like material, mechanically mixing the solutions and substantially homogeneously coagulating the resultant mixture to form a homogeneous mass in the absence of sufficient balata vulcanizing materials to promote vulcanization, and subject the mass to subsequent masticating, drying, mixing and forming operations.

3. The process of providing an improved composition of material consisting in separately preparing an aqueous dispersion of uncoagulated vulcanized rubber latex and a solution of deresinated unvulcanized balata, mixing the dispersion and solution and coagulating the resultant mixture, in the absence of sufficient balata vulcanizing materials to promote vulcanization of the balata, to form a substantially homogeneous material.

4. The process of providing an improved composition of matter consisting in separately preparing an aqueous dispersion of vulcanized rubber latex containing glue in liquid form, and a substantially non-aqueous solution of substantially de-resinated unvulcanized balata or like material, mixing the dispersion and solution and coagulating the resultant mixture, in the absence of sufficient balata vulcanizing materials to promote vulcanization of the balata, to form a substantially homogeneous material.

5. The process of providing an improved composition of material consisting in separately preparing an aqueous dispersion of uncoagulated vulcanized rubber latex and a solution of deresinated unvulcanized balata, mixing the dispersion and solution and coagulating the resultant mixture, in the absence of sufficient balata vulcanizing materials to promote vulcanization of the balata, to form a substantially homogeneous material, and subsequently adding compounding materials thereto, having an absence of balata vulcanizing material, and intimately mixing said compounding materials and the rubber-balata compound.

6. The process of providing an improved composition of matter consisting in separately preparing an aqueous dispersion of vulcanized rubber latex containing glue in liquid form, and a substantially non-aqueous solution of unvulcanized substantially de-resinated balata or like material, mixing the dispersion and solution and coagulating the resultant mixture, in the absence of sufficient balata vulcanizing materials to promote vulcanization of the balata, to form a substantially homogeneous material, and subsequently adding coloring materials thereto, having an absence of balata vulcanizing material, and intimately mixing said coloring materials and the rubber-balata compound.

7. The process of providing an improved composition of matter consisting in separately preparing a dispersion of uncoagulated vulcanized rubber latex and de-resinated unvulcanized balata, mixing the dispersion and solution and upon the application of heat forming a tough homogeneous rubber compound.

8. The process of providing composition of matter consisting in separately preparing a dispersion of non-coagulated vulcanized rubber latex, dissolving unvulcanized balata and mixing the non-coagulated vulcanized rubber latex, balata and glue, the mixture upon the application of heat forming a tough homogeneous rubber compound.

WILLIS E. REICHARD.
ROBERT R. OLIN.